Patented Jan. 12, 1943

2,308,364

UNITED STATES PATENT OFFICE 2,308,364

SEPARATION AND RECOVERY OF POTASSIUM COMPOUNDS FROM MAGNESIUM BISULPHITE COOKING LIQUOR

Raymond S. Hatch, Longview, Wash., assignor to Weyerhaeuser Timber Company, Longview, Wash., a corporation of Washington No Drawing. Application July 23, 1941,
Serial No. 403,705

3 Claims. (Cl. 23—48)

This invention relates to the production of cellulose pulp and more particularly to the use of magnesium bisulphite liquor in cooking cellulose containing materials with recovery of magnesium oxide and sulphur dioxide and the recombination thereof to regenerate the cooking liquor.

For many years the waste liquors resulting from the cooking of wood by the sulphite process have been discharged into streams or waterways with resulting pollution thereof. No attempt was made to recover the chemicals used in the cooking process or the heat available in the organic matter extracted from the wood. Within the last few years a cyclic system involving the cooking of wood with a relatively pure magnesium base sulphite liquor, separating the waste liquors, and recovering the heat from the organic constituents and the chemicals in the form of fresh cooking acid, has been successfully developed, as is disclosed in a prior application of applicant and G. V. Palmrose, Serial No. 252,910, filed January 26, 1939. In a cyclic system of the character described, impurities are necessarily introduced into the system during the various operations and tend to accumulate to an undesirable extent. U. S. Patent 2,238,456 discloses a method of continuously removing calcium impurities in such a cyclic system. I have found that where woods relatively rich in potassium salts are cooked for the production of pulp, removal from the recovery system of the potassium extracted from the wood is highly desirable to insure continuity of operation.

In the operation as normally conducted, wood chips are cooked under suitably regulated conditions with a liquor consisting of a solution of magnesium bisulphite in proper concentration for a period sufficient to release the cellulose fibres from the non-cellulose portions of the wood. Following the cooking operation, the waste liquor is concentrated by evaporation and is then burned to recover the heat from the organic material extracted from the wood. The heat may be utilized in connection with waste heat boilers to afford steam which is usable in the plant. Magnesium oxide is recovered as an ash either in the furnace or in suitable cyclone separators. The magnesium oxide is mixed with water to provide a slurry and the sulphur dioxide in the burner gases is combined with this slurry to provide magnesium bisulphite. When suitably fortified with additional amounts of magnesium and of sulphur dioxide to make up losses in the system, the liquor may be reutilized from the cooking operation.

The wood from which the cellulose is recovered contains small amounts of several inorganic chemical salts, among which are salts of calcium, magnesium iron, aluminum, manganese, potassium and sodium. In the case of western hemlock, the average ash content of the bone dry wood amounts to approximately 0.295%. Analysis of this ash shows 22.04% of the metals including iron, aluminum and manganese expressed as oxides, 26.42% of calcium oxide, 6.62% of magnesium oxide and 38.95% of potassium oxide.

While the actual percentage of potassium in the wood is relatively small, the amount which would be attained as a byproduct from the recovery cycle assumes considerable proportions because the tonnage of wood consumed in a modern sulphite pulp mill is relatively large. For example, the theoretical amount of potassium sulphate which might be recovered per day from a mill producing 300 tons of sulphite pulp per day using western hemlock as a raw material amounts to 660 pounds.

When the ash resulting from the combustion of the waste sulphite liquor is made into a slurry and combined with sulphur dioxide of the combustion gases to form sufficient cooking acid, the acid becomes contaminated with the soluble compounds other than magnesium which are extracted from the wood. By maintaining proper pH conditions in the recovered acid, it is possible to produce an acid in which compounds of the iron and aluminum group as well as calcium compounds remain undissolved, and these may be filtered from the relatively pure solution containing magnesium bisulphite. It is necessary to remove these chemical compounds at each cycle in order to prevent their accumulation in the cooking acid and the waste liquor with attendant difficulties due to their presence which would affect either the quality of the finished pulp produced or cause difficulties in the evaporation of the waste liquor. Thus, the presence of calcium salts is undesirable because in the burning process such salts are converted into calcium sulphite which eventually tends to deposit as a scale in the tubes of the evaporator used for concentrating the waste liquor, thereby materially cutting down the efficiency of evaporation.

The potassium salts extracted from the wood are not so readily eliminated. Under certain conditions of temperature a part of the potassium in the form of potassium sulphate will pass through the entire system as a fume which eventually is discharged from the absorption towers. A considerable part of the potassium sulphate, particularly if the potassium content of the wood is relatively high, forms crystalline leaf-like structures with some magnesium oxide at points in the waste heat boiler where the hot combustion gases are cooled by the relatively cool boiler tubes. This mixture of potassium sulphate and magnesium oxide may be removed easily from the boiler with the magnesium oxide ash and is collected eventually in the cyclone. When the magnesium oxide ash containing potassium sulphate is made into a slurry and used for absorbing sulphur dioxide from the combustion gases, the inert potassium sulphate is dissolved in the recovered acid and when the latter is re-used in the cycle the amount of potassium salts is augmented by solution from the wood.

If no provision is made to separate the potassium content from the regenerated liquor, it will increase progressively to some unknown equilibrium point. It has been demonstrated in the recovery process that this concentration may reach relatively high proportions and as a result the quality and activity of the magnesium oxide ash will be seriously affected. Apparently when relatively high concentrations of potassium sulphate are reached, the presence of this compound affects the crystalline character of the magnesium oxide recovered and under these conditions the magnesium oxide does not hydrate so easily as does magnesium oxide produced by burning waste liquor in which the potassium sulphate concentration is low.

It is the object of the present invention to provide a simple and effective method of producing pulp using magnesium bisulphite liquor with cyclic regeneration in the manner described and to separate and recover potassium compounds as byproducts which can be utilized commercially so that the efficiency of the procedure is improved both with respect to the effectiveness of the cooking process and the value of the products obtainable therefrom.

Another object of the invention is to afford an efficient and commercially practicable procedure for the recovery of potassium compounds from sulphite cooking liquors.

I have discovered that the separation and recovery of potassium compounds from magnesium sulphite cooking liquors can be accomplished by leaching the magnesium oxide ash with water before it is combined with the sulphur dioxide in the combustion gases. The potassium sulphate is readily soluble in water, but the problem is complicated by the fact that in burning the magnesium base waste liquors a certain proportion of the magnesium originally present is converted into magnesium sulphate which is also very soluble in water and is consequently leached from the ash with the potassium sulphate. It is necessary therefore to separate the magnesium from the potassium in the leached liquors. Fortunately this can be accomplished by adding a calculated amount, based upon the proportion of magnesium present in the leached liquors, of potassium carbonate or potassium hydroxide which will precipitate all of the magnesium as the carbonate or hydroxide, leaving a relatively pure potassium sulphate solution. This solution may then be evaporated to recover the potassium sulphate in a relatively pure and marketable form.

Alternatively the potassium may be recovered and utilized as a double salt of potassium and magnesium having commercial value. Under certain conditions of concentration, solutions of magnesium and potassium sulphate will form so-called double salts, the molecular ratio of potassium and magnesium therein being variable to some extent. Some of these double salts occur in natural deposits and are either mined or separated in the form of double salts in the refining of crude minerals. It is possible therefore to evaporate the leached liquors from the magnesium oxide ash to a point where double salts of potassium and magnesium will crystallize from the liquor, and when so recovered the double salts may be utilized for the purposes for which they are adapted.

It is not essential to separate the potassium sulphate from the magnesium oxide ash at each cycle unless, as in the case of wood containing very high proportions of potassium compounds, the waste liquor is highly concentrated in potassium sulphate at each cycle. Generally, potassium sulphate is not sufficiently concentrated in the magnesium sulphite liquor or in the waste liquor after a single cycle to seriously affect the crystalline character of the magnesium oxide which is recovered by burning the waste liquor. It is sufficient, therefore, under ordinary conditions to leach the magnesium oxide ash only at periodic intervals, the length of the period being determined in view of the nature of the wood which is being cooked, that is to say, the amount of potassium compounds which the wood of the particular species treated may carry. However, it is essential that the potassium sulphate be removed at intervals for the reasons already described, since otherwise it becomes impossible to maintain the cycle in satisfactory operation, and the advantage accruing from the use of magnesium bisulphite and the regeneration of the liquor will be lost except in the case of certain species of wood in which the potassium content is so low that the amount present is eliminated as fume and does not progressively concentrate in the acid cooking liquor.

Various changes may be made in the procedure as described without departing from the invention or sacrificing the advantages thereof.

I claim:

1. In a cyclic process involving the cooking of wood with a relatively pure magnesium bisulphite cooking acid, removing and extracting the waste liquor from the cooking operation, concentrating and burning the waste liquor to recover heat from the organic material, magnesium oxide, as an ash, and sulphur dioxide in the combustion gases, recombining the magnesium oxide ash and the sulphur dioxide in the combustion gases to form fresh cooking acid, the steps which comprise periodically removing soluble potassium salts extracted from the wood and contained in the ash from the combustion process by leaching the ash with water and recovering potassium and magnesium compounds from the resulting liquor.

2. In a cyclic process involving the cooking of wood with a relatively pure magnesium bisulphite cooking acid, removing and extracting the waste liquor from the cooking operation, concentrating and burning the waste liquor to recover heat from the organic material, magnesium oxide, as an ash, and sulphur dioxide in the combustion gases, recombining the magnesium oxide ash and the sulphur dioxide in the combustion gases to form fresh cooking acid, the steps which comprise periodically removing soluble potassium salts extracted from the wood and contained in the ash from the combustion process by leaching the ash with water, precipitating magnesium compounds from the resulting liquor, removing the precipitated magnesium compounds and evaporating the solution of potassium sulphate so formed to produce a relatively pure potassium sulphate in crystalline form.

3. In a cyclic process involving the cooking of wood with a relatively pure magnesium bisulphite cooking acid, removing and extracting the waste liquor from the cooking operation, concentrating and burning the waste liquor to recover heat from the organic material, magnesium oxide, as an ash, and sulphur dioxide in the combustion gases, recombining the magnesium oxide ash and the sulphur dioxide in the combustion gases to form fresh cooking acid, the steps which comprise periodically removing soluble potassium salts extracted from the wood and contained in the ash from the combustion process by leaching the ash with water, precipitating magnesium compounds from the resulting liquor, removing the precipitated magnesium compounds, evaporating the solution of potassium sulphate so formed to produce a relatively pure potassium sulphate in crystalline form, separating the crystalline potassium sulphate from the mother liquor, and recovering potassium and magnesium compounds as a double salt from the mother liquor.

RAYMOND S. HATCH.